United States Patent

Hoogendoorn et al.

[15] 3,639,976

[45] Feb. 8, 1972

[54] METHOD OF MOUNTING A FERRITE HEAD

[72] Inventors: Helen M. Hoogendoorn, Schenectady; Herbert E. Liberman; Bernt Narken; Brian Sunners, all of Poughkeepsie, all of N.Y.

[73] Assignee: International Business Machines Corporation, Armonk, N.Y.

[22] Filed: Aug. 3, 1970

[21] Appl. No.: 60,235

Related U.S. Application Data

[62] Division of Ser. No. 709,457, Feb. 29, 1968, Pat. No. 3,562,444.

[52] U.S. Cl. ..........................29/603, 29/527.1, 179/100.2 C

[51] Int. Cl. ..........................................G11b 5/42, H01f 7/06

[58] Field of Search...................29/603, 527.1; 179/100.2 C; 340/174.1 F; 346/74 MC

[56] References Cited

UNITED STATES PATENTS

| | | | |
|---|---|---|---|
| 3,384,954 | 5/1968 | Bradford et al. | 29/603 |
| 3,458,926 | 8/1969 | Maissel et al. | 29/603 |
| 3,514,851 | 6/1970 | Perkins et al. | 29/603 |
| 3,577,634 | 5/1971 | Secrist | 29/603 |

*Primary Examiner*—John F. Campbell
*Assistant Examiner*—Carl E. Hall
*Attorney*—Hanifin and Jancin and Wolmar J. Stoffel

[57] ABSTRACT

A method of mounting a ferrite head within a slider wherein the head is positioned within a slot on the slider, a mass of glass composition is heated to thereby fill the gap between the head and slider, machining the head while being held between solidified glass and subsequently heating a second mass of glass by infrared radiation to fill in the depression created by the machine operation.

8 Claims, 8 Drawing Figures

INVENTORS
HELEN M. HOOGENDOORN
HERBERT E. LIBERMAN
BERNT NARKEN
BRIAN SUNNERS

Wolmar J. Stoffel
ATTORNEY

METHOD OF MOUNTING A FERRITE HEAD

CROSS-REFERENCE TO RELATED APPLICATION

This application is a divisional of application, Ser. No. 709,457, filed Feb. 29, 1968, now U.S. Pat. No. 3,562,444, and entitled Recording Head Assembly.

BACKGROUND OF THE INVENTION

The present invention relates to ferrite head assemblies and to the precise mounting of a ferrite head within the slot of a ceramic slider, using glass as the bonding material and infrared sealing techniques.

Present ferrite recording head assemblies consist of a glass-gapped ferrite head, epoxy bonded into an alumina slider. The head is formed of two ferrite members separated by a gap filled with nonmagnetic material, typically glass, which also bonds the members together. The head is machined to its finally desired width, positioned within the slot of a mounting structure or alumina slider, placed into a conventional furnace to cure the epoxy material and thereby bond the head within the slider slot, and then polished to the finally desired gap height and smoothness.

Both the ultimate structure achieved and its method of manufacture have certain disadvantages.

Thus, for example, the epoxy material has proven to be dimensionally unstable, particularly during the temperature cycling. Ferrite head assemblies, especially multihead assemblies, require a precise mounting relationship of elements. Normally, there is a great difference between the coefficients of expansions of epoxy materials and the other elements of the assembly. This difference between coefficients of expansions produces undesirable stresses which may lead to misalignment during the actual bonding step, subsequent processing steps, testing procedures or actual use.

Curing the epoxy material is time consuming, on the order of 24 hours. The jigs used to provide relative positioning between the head and slider degrade due to the long exposure to heat. Also, the jigs are made of material which have different coefficients of expansion than the parts being bonded together, further contributing to misalignment during assembly.

In addition, the head assembly must present a smooth surface to reduce wear on the magnetic recording surface during actual use. Epoxy, however, has poor polishing and wear properties.

Another problem stems from the fact that the head is of very brittle material. The requirement that the head be machined to its finally desired width prior to bonding to the slider reduces yield due to the higher percentage of breakage occasioned by handling the very thin head prior to bonding.

For these reasons, as well as others, it has been considered desirable to seek a bond consisting of a stable, higher temperature material and to seek improved bonding methods.

It is an object of the present invention, therefore, to provide an improved ferrite head recording assembly.

Another object is improved bonding of a ferrite head within a supporting structure or slider.

Still another object is a higher yield in the fabrication of ferrite recording head assemblies.

SUMMARY OF THE INVENTION

These and other objects are accomplished in accordance with the present invention, one illustrative embodiment of which comprises a recording head assembly in which a glass-gapped ferrite head is bonded into a ceramic slider with a glass, the head being of reduced width in the region of its glass gap. The assembly is formed by initially placing the head in a slot in the slider in a position generally conforming to the finally desired assembled relationship and in such a manner as to establish a first region therebetween for reception of bonding material. Low temperature glass is located on top of the slider over the slot. The glass is heat flowed into the region between the head and slider. The heating continues until the region between the head and slider is filled. The assembly is then cooled.

In the next operation the head is machined, as with a small diameter diamond saw wheel, in the gap region to its finally desired position and width, with the first mass of glass supporting the head during this step. A second mass of glass is then heat flowed between the head and first mass of glass, but without disturbing the bond formed between the first mass of glass and the slider. Finally, after cooling, the protruding glass and ferrite head are ground and polished to the desired height and smoothness.

In the above process the initial heating step can be accomplished by conventional furnace cycling. Any misalignment resulting can be corrected in the subsequent machining step. However, it is preferably accomplished by the use of infrared energy. Such heating has the capability of being very localized and therefore capable of producing very rapid heating.

Most glasses are poor infrared absorbers. Thus if the initial heating step is accomplished by the use of infrared energy, the pieces to be joined will absorb the infrared radiation and soften the glass by conduction. Preferably, the glass is lightly doped with an additive which renders the glass somewhat more infrared absorbent. Cupric oxide is a preferred additive.

In accordance with the teachings of the present invention, the second heating step is accomplished by the use of infrared energy. Where the initial step was accomplished by infrared heating as well, the glass used in the second step must be more heavily doped to render it more infrared absorbent. By so doing, the softening of the second mass of glass will not disturb the seal created in the initial heating step.

BRIEF DESCRIPTION OF THE DRAWING

The foregoing and other objects, features and advantages of the invention will be apparent from the following more particular description of the preferred embodiments of the invention as illustrated in the accompanying drawing, wherein.

DESCRIPTION OF THE PREFERRED EMBODIMENTS

Figure 1:
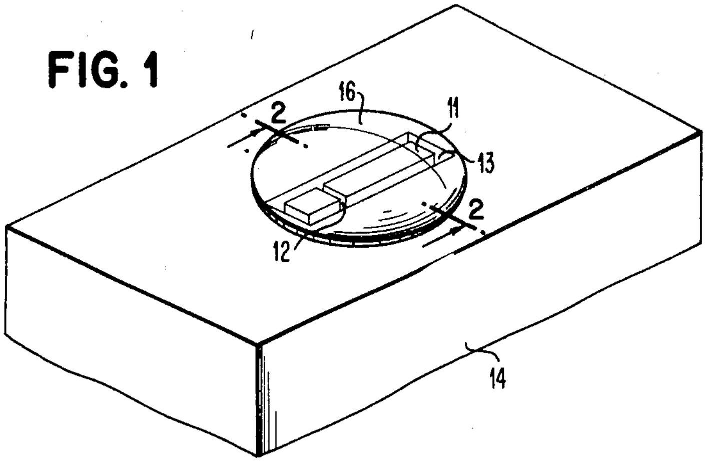
FIG. 1 is a perspective view, broken away, of the principal elements of the assembly of the present invention.

Referring now to the drawing, FIG. 1 illustrates in perspective a ferrite head 11, glass gapped at 12, which head is to be bonded within the slot 13 of a supporting structure or slider 14. The head 11 is to be used for reading and erasing information on a magnetic recording surfaces such as discs.

The head material is a ferrite such as Ni-Zn having a coefficient of thermal expansion on the order of $90\times10^{-7}/°C$.

The ferrite head gap glass must have a reasonably high melting point so as to avoid softening during subsequent bonding operations, but no so high as to cause reaction with the ferrite material.

In addition, its coefficient of thermal expansion should reasonably match that of the ferrite from set point to room temperature. Glass is considered to become rigid on cooling to the set point, the point where internal stresses start to develop. This is typically 5° above the strain point. The strain point is defined in ASTM Specification C336–54T.

One glass found to be satisfactory has the following composition in weight percent:

| Glass A | Weight Percent |
|---|---|
| $SiO_2$ | 30.8 |
| $P_6O$ | 14.8 |
| $B_2O_3$ | 19.9 |
| $Al_2O_3$ | 3.8 |
| BaO | 26.3 |
| $As_2O_3$ | 0.5 |
| CaO | 3.9 |

Composition A has a softening point of 777° C., set point of 617° C., and anneal point of 641° C. Above 650° C. some change in gap dimension occurs so that subsequent bonding and thermal cycling steps should occur at less than 650° C.

Another glass, which was described in 9 IBM T.D.B. No. 11, p. 1,457 (Apr., 1967), has the following composition:

| Glass B | Mol % | Wt % |
|---|---|---|
| CaO | 12.0 | 7.9 |
| BaO | 23.0 | 41.8 |
| $B_2O_3$ | 11.4 | 9.3 |
| $SiO_2$ | 48.1 | 34.1 |
| $Al_2O_3$ | 5.3 | 6.4 |
| $AsO_3$ | 0.2 | 0.5 |

The slider 14 is comprised of ceramic material having a coefficient of expansion near to or greater than that of the ferrite material chosen for the head. The sliders may be formed by casting and lamination techniques or pressing from mixed titanates, fosterites, barium titanate and the like and should be capable of polishing to a high finish.

An example of a mixed titanate composition is as follows:

| Mixed Titanate A | Weight Percent |
|---|---|
| $BaTiO_3$ | 70.0 |
| $CaTiO_3$ | 13.1 |
| $SrZrO_3$ | 9.1 |
| $SrTiO_3$ | 5.6 |
| $MgTiO_3$ | 2.2 |

Figure 2:
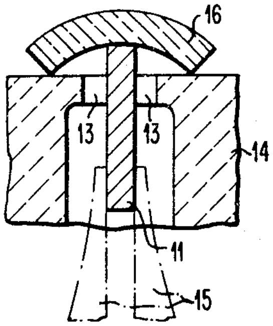
FIGS. 2 through 7 are progressive sectional side views, taken along the line 2—2 of FIG. 1 broken away, of the bonding steps utilized in the present invention.

In FIG. 2, head 11, which is typically initially 7 mils wide, is held within slot 13, which may be on the order of 30 mils wide. The head 11 is held in alignment relative to the slider 14 by a clamping assembly, shown in phantom at 15. A low-temperature glass 16 is located on top of slider 14 over slot 13.

This glass material must be capable of wetting the ferrite head and slider, and it must be capable of forming a seal without affecting the glass seal formed in the ferrite head gap. Thus, where Glass A is used in the gap, bonding temperature should be below 650° C.

Secondly, glass is more sensitive to tensile stresses. Hence, glass with a slightly lower expansion coefficient than that of the slider material is preferred in order to effect a compression seal.

In addition, preferably the glass should not be subject to uncontrolled devitrification. Devitrified glass may not take on the high polish necessary to insure a smooth bearing surface for the magnetic surface.

Finally, as will be explained in more detail below, the bonding glass preferably should be infrared absorbent.

Various configurations for the bonding material may be used. However, it was found that a glass disc, typically three-sixteenths of an inch in diameter and one thirty-second of an inch thick, eliminated voids in the bond at each end of the head. The glass disc should be lightly polished on both sides to remove slicing marks.

In the next operation the ferrite head 11 is bonded within the slot 13 of the slider 14. This can be accomplished by conventional furnace cycling. Infrared bonding however, is preferred because a glass bond can be made in a relatively short time and the area heated can be controlled thus eliminating heating of the tooling.

Figure 3:
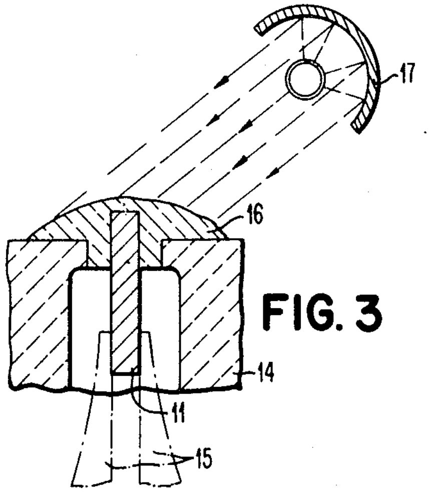

Referring to FIG. 3, a source of infrared energy 17 such as a quartz iodine lamp, Spot Heater, RI Model 5292, with a peak output occuring at approximately 0.8–1.8 microns, is focused on the disc and activated. The source heats the disc 16, head 11 and slider 14 in the area where bonding is desired but without significantly heating the clamping assembly 15 or associated elements, since the lamp's intensity decreases as the distance from the focal plane increases. Because the heating is localized, the tooling does not become subjected to high-temperature exposure. As previously pointed out, this can cause damage to the tooling as well as expansion of same which can result in misalignment between the parts being held.

Most glasses are poor infrared absorbers. Hence, when using an ordinary glass, i.e., undoped, the head and slider become heated and soften the glass by conduction. The infrared absorption properties of the glass are improved by doping, i.e., by adding a small amount of a constituent to render the glass infrared absorbing.

Typical examples of ordinary glass systems that can be used as the bonding material are $PbO—Al_2O_3—B_2O_3—SiO_2$, and $PbO—ZnO—B_2O_3$ (with additions of $SiO_2$ or $Al_2O_3$). Such glasses can be characterized as low-temperature nondevitrifying glasses with softening points in the range of 450°–500° C. Lead oxide is a primary component in the range of 50 to 80 percent by weight. Such glasses, however, are substantially transparent to infrared radiation. Thus, by using these glasses alone, normally it is primarily heating of the head and slider and conduction therefrom which softens the glass, not the direct heating of the glass itself.

An addition is made to the glasses to increase the infrared absorption properties of same, in turn reducing the time required to soften the glass. Preferably, the additive decreases the softening point to reduce the required heating time but without adversely affecting other desirable properties.

In a preferred embodiment a lead alumina-borosilicate glass system of the following composition was employed:

| Bonding Glass | Weight Percent |
|---|---|
| PbO | 73.4 |
| $Al_2O_3$ | 5.1 |
| $B_2O_3$ | 6.3 |
| $SiO_2$ | 15.2 |

Cupric oxide was selected as the dopant because it can easily be incorporated into a high lead-glass and it decreases the softening point slightly without significantly changing the expansion coefficient. Most important, the cupric ions form strong asymmetrical groups in a lead glass which intensify absorption.

Table I below shows the effects of cupric oxide doping on the properties of the lead-alumina-borosilicate glass above.

TABLE I

Properties of copper-doped, infrared-absorbing glasses:

| Wt. percent CuO | Soft pt., ° C. | I.R. absorption | T.C.×10⁻⁷. rm.-set pt. |
|---|---|---|---|
| 0.0 | 479 | Increases | 80.1 |
| 0.1 | 482 | do | 81.5 |
| 0.5 | 482 | do | 80.6 |
| 1.0 | 476 | do | 80.0 |
| 2.0 | 475 | do | 79.6 |
| 3.0 | 471 | do | 78.2 |
| 5.0 | 463 | do | 76.6 |

It has been determined that the use of cupric oxide in excess of 7 percent by weight results in glass compositions that have a tendency to devitrify. Such devitrifying glass compositions, in addition to not having the capability of taking a high polish, are weaker and more subject to fracture, and are pervious at the grain boundaries. Consequently, the use of CuO in excess of 7 percent is undesirable, Preferably, CuO content should not exceed 5 percent while percentages less than 0.05 percent by weight generally do not absorb infrared radiant energy sufficiently. A glass having a CuO concentration of 0.05 to 1.0 percent is preferred for the first heating step.

It is also desirable to match the absorption of the glass to that of the ceramic in order to prevent an excessive temperature gradient. A too strongly absorbing glass will melt before the slider has a chance to heat up and a cold seal could therefore result. Therefore, as a rule, the glass and slider should heat uniformly.

The heating is continued until the disc softens and fills the slot between the head and slider. A shelf (not shown) within the slider controls the depth of the bonding glass. The heating is accomplished in a relatively short time, ordinarily under 5 minutes, depending upon the specific glass composition, size of the disc, intensity of source, and size of the slider and head. Polishing the head on both sides prior to bonding insures a bubble-free bond. The resultant shape of the flowed glass is as shown in FIG. 3. The assembly is then cooled and the clamping means removed.

Figure 4:
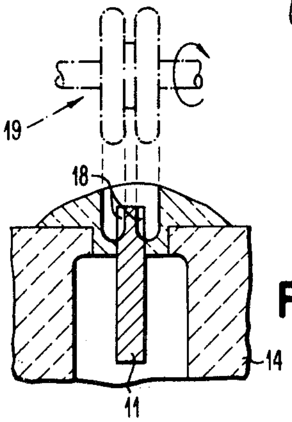

In the next operation depicted by FIG. 4, the head is machined, as with a diamond saw wheel shown in phantom at 19, in the region 18 of the glass gap to its finally desired width, typically 4.7 mils. The effect of this operation also is to remove some of the glass bonded to the head in the previous operation, below the level of the top surface of the slider.

The advantage of machining the head 11 after an initial bonding in the slider slot 13 is twofold. There is no handling of the head after it has been machined to its narrow width, thus reducing the likelihood of breakage. Secondly, assuming that there was a slight misalignment in the initial bonding step, this can be corrected by the subsequent machining.

Figure 5:
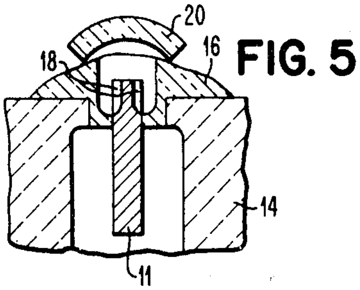

In the next operation illustrated in FIG. 5, a second disc 20 of glass is located above and in close proximity to the head and slider, covering the region where the head has been machined.

The glass chosen for the second bonding operation is preferably the same as chosen for the first operation, except that it must be more heavily doped with cupric oxide, typically 3 percent so as to provide the glass with more heat-absorbent properties.

Figure 6:
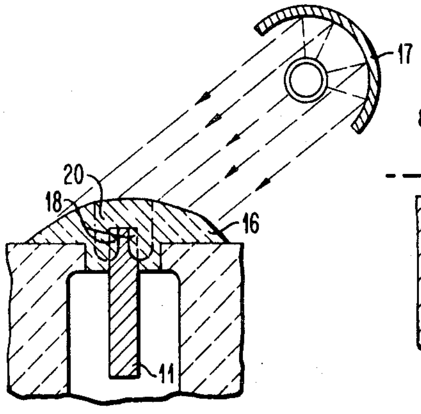

Then, as shown in FIG. 6, the source of infrared energy 17 is focused at disc 20 and activated. The source heats the disc, head, and first mass of bonding glass, in the area where bonding is desired, but without disturbing the bond formed between the first mass of glass and the slider. This is because the second disc was more heavily doped with cupric oxide.

The heating continues until the disc softens and flows between the head and first mass of glass.

Figure 7:
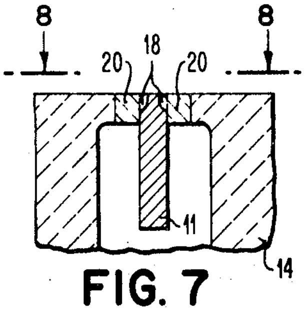

After cooling, the protruding glass and ferrite head are then ground and polished as indicated in FIG. 7, to the desired height and smoothness. The glass acts to support the head during the smoothing operation. Smoother edges with better definition are achieved.

Figure 8:
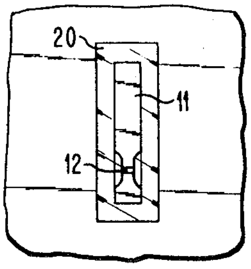
FIG. 8 is a plan view, broken away, of the completed magnetic head assembly of the present invention.

The completed bond assembly is as shown in FIG. 8 and includes a ferrite head glass bonded in precise alignment within a supporting ceramic slider.

The invention has been described in connection with a single head assembly. It is apparent that multihead assemblies could be fabricated in the same manner, and to further advantage, particularly in view of the alignment feature which this invention provides.

While the invention has been particularly shown and described with reference to a preferred embodiment thereof, it will be understood by those skilled in the art that the foregoing and other changes in form and details and omissions may be made therein without departing from the spirit and scope of the invention.

What is claimed is:

1. In the method of precisely mounting a first member relative to a second member the steps comprising;

fixing the relative positions between said members generally conforming to the finally desired assembled relationship and in such a manner as to establish a first region therebetween for reception of bonding material;

locating a first mass of a glass composition in close proximity to said first region;

heating said first mass of glass composition to at least the softening point to thereby flow and fill said first region;

cooling until said first mass of glass composition solidifies, thereby forming a seal with said first and second members;

machining said first member, while being held by said first solidified mass of glass, so that it exactly conforms to its finally desired size and location, simultaneously creating a second region between said first member and said first solidified mass of glass;

locating a second mass in close proximity to said second region;

heating said second mass to at least the softening point by exposure to a source of infrared radiation to thereby flow and fill said second region without disturbing the seal between said second member and the first solidified mass of glass; and cooling until said second mass of glass composition solidifies and forms a seal with said first mass and first member.

2. In the method of mounting a glass-gapped ferrite head within a ceramic slider, said head and slider having dimensions of height and width, the steps comprising;

fixing the relative positions between said head and slider generally conforming to the finally desired assembled relationship and in such manner as to establish a first region therebetween for reception of bonding material;

the initial height and width of said head being greater than required;

locating a first mass of a glass composition in close proximity to said first region;

heating said first mass of glass composition to at least the softening point to thereby flow and fill said first region;

cooling until said first mass of glass composition solidifies, thereby forming a seal with said slider and said head;

machining said head while being held by said first solidified mass of glass, so that it exactly conforms to its finally desired width and location, simultaneously creating a second region between said head and said first solidified mass of glass;

locating a second mass in close proximity to said second region;

heating said second mass to at least the softening point by exposure to a source of infrared radiation to thereby flow and fill said second region without disturbing the seal between said slider and the first solidified mass of glass;

cooling until said second mass of glass composition solidifies and forms a seal with said first mass and said head; and grinding and polishing said slider and said head to their finally desired height and smoothness.

3. The invention defined by claim 2 wherein the said masses of glass have melting points less than the melting point of said glass in said ferrite head gap.

4. The invention defined by claim 2 wherein the coefficients of expansion of said masses of glass are less than the coefficients of expansion of said slider and head.

5. The invention defined by claim 2 wherein said first mass of glass is heated by exposure to a source of infrared radiation, said second mass of glass being more infrared absorbent than said first.

6. The invention defined by claim 5 wherein said masses of glass are low-temperature glasses with lead oxide as a primary component in an approximate range of 50–80 percent by weight.

7. The invention defined by claim 6 wherein said low-temperature glasses include cupric oxide of less than 7 percent weight concentration as a constituent, to improve infrared absorption properties.

8. The invention defined by claim 5 wherein said cupric oxide concentration is approximately between 0.05 and 0.1 percent in said first mass of glass and approximately 3.0 percent in said second mass of glass.

* * * * *